(12) United States Patent
Rubin et al.

(10) Patent No.: US 12,252,156 B2
(45) Date of Patent: Mar. 18, 2025

(54) AUTONOMOUS RACETRACK DRIVER COACH AND DEMONSTRATOR

(71) Applicant: GM GLOBAL TECHNOLOGY OPERATIONS LLC, Detroit, MI (US)

(72) Inventors: Daniel Yitzhak Rubin, Holon (IL); Alon Capua, Hulda (IL)

(73) Assignee: GM Global Technology Operations LLC, Detroit, MI (US)

( * ) Notice: Subject to any disclaimer, the term of this patent is extended or adjusted under 35 U.S.C. 154(b) by 394 days.

(21) Appl. No.: 17/889,502

(22) Filed: Aug. 17, 2022

(65) Prior Publication Data

US 2024/0059325 A1 Feb. 22, 2024

(51) Int. Cl.
*B60W 60/00* (2020.01)
*B60W 30/10* (2006.01)

(52) U.S. Cl.
CPC ........ *B60W 60/0027* (2020.02); *B60W 30/10* (2013.01); *B60W 2520/06* (2013.01)

(58) Field of Classification Search
CPC ............. B60W 60/0027; B60W 30/10; B60W 2520/06
See application file for complete search history.

(56) References Cited

U.S. PATENT DOCUMENTS

| | | | | |
|---|---|---|---|---|
| 9,092,983 B1 * | 7/2015 | Klimek | .................. | G08G 1/13 |
| 2017/0039870 A1 * | 2/2017 | Ellis | ........................ | G09B 9/04 |
| 2020/0126448 A1 * | 4/2020 | Spano | ..................... | G06F 3/165 |
| 2020/0184849 A1 * | 6/2020 | Spence | ........... | B60W 30/18145 |
| 2021/0192975 A1 * | 6/2021 | Spence | ................ | G01C 21/365 |
| 2022/0114909 A1 * | 4/2022 | Patenaude | .............. | G09B 9/042 |
| 2022/0242441 A1 * | 8/2022 | Thompson | ........... | G06V 10/774 |
| 2024/0107118 A1 * | 3/2024 | Ellingford | ............. | G06F 3/0488 |
| 2024/0270261 A1 * | 8/2024 | Thompson | ........ | B60W 50/0097 |

* cited by examiner

*Primary Examiner* — Hussein Elchanti

(74) *Attorney, Agent, or Firm* — Quinn IP Law

(57) ABSTRACT

A method of operating an autonomous racetrack driver coach and demonstrator in an autonomous vehicle employing operating systems for propulsion and maneuvering includes identifying a road course and mapping a velocity profile and a trajectory for the vehicle via a remote configurator. The trajectory defines a vehicle path around the road course and with the velocity profile minimizes the vehicle's lap time. The method also includes determining a presence of a human passenger/operator in the vehicle. The method additionally includes determining, via an electronic controller in communication with a remote detection source, localization of the vehicle on the road course. The method also includes determining vehicle velocity, acceleration, and heading relative to the mapped trajectory. Furthermore, the method includes operating the vehicle, with the human passenger/operator situated therein, to follow the mapped trajectory using feedback control of the operating systems in response to the determined localization, velocity, acceleration, and heading.

20 Claims, 3 Drawing Sheets

AUTONOMOUS RACETRACK DRIVER COACH AND DEMONSTRATOR

INTRODUCTION

The present disclosure relates to a system and a method for providing an autonomous racetrack driver coach and demonstrator in a motor vehicle.

Autonomous vehicles include sensors, such as lidar, radar, and cameras, operable to detect vehicle operation and the environment surrounding the vehicle, and a computing device operable to control all aspects of vehicle operation. Autonomous vehicles generally employ a vehicle navigation system integrated with vehicle controls, drive-by-wire systems, vehicle-to-vehicle communication, and/or vehicle-to-infrastructure technology to identify vehicle position and navigate the vehicle.

Typically, a vehicle navigation system uses a global positioning system (GPS) system to obtain its position data, which is then correlated to the vehicle's position relative to a surrounding geographical area. Based on the GPS signal, when directions to a specific waypoint are needed, routing to such a destination may be calculated, thereby determining a vehicle path. Specifically, the vehicle sensors and the computing device may cooperate to identify intermediate way points and maneuver the vehicle between such way points to maintain the vehicle on the selected path.

While autonomous vehicles offer many potential advantages over traditional vehicles, in certain circumstances it may be desirable to train humans to operate and maneuver such a vehicle without autonomous assistance or control. For example, a human may wish to operate the vehicle for personal satisfaction and/or engage in competitive driving, such as on a closed-circuit racecourse or track. Current techniques for training humans to drive a vehicle on an actual track typically include a human instructor. However, engaging a human instructor may be time consuming, costly, and/or difficult to schedule. Additionally, techniques used by a particular human instructor may not always be optimal.

SUMMARY

A method of operating an autonomous racetrack driver coach and demonstrator in an autonomous motor vehicle employing vehicle operating systems for propulsion and maneuvering includes identifying a road course. The method also includes mapping a trajectory and a velocity profile for the vehicle via a configurator arranged remotely from the vehicle. The mapped trajectory defines a path of the vehicle around the road course and with the mapped velocity profile is intended to minimize the vehicle's road course lap time. The method also includes determining a presence of a human passenger/operator situated in the vehicle.

The method additionally includes determining, via an electronic controller in communication with a detection source arranged remotely from the vehicle, such as a global positioning system (GPS), localization of the vehicle on the road course. The method also includes monitoring the localization and determining velocity, acceleration, and heading of the vehicle, via the electronic controller, relative to the mapped trajectory on the road course. Furthermore, the method includes operating the vehicle, with the human passenger/operator situated therein, via the electronic controller, to follow the mapped trajectory using feedback control of the vehicle operating systems in response to the determined localization, velocity, acceleration, and heading.

The autonomous racetrack driver coach and demonstrator may be operated in a driver coach mode. In such an embodiment, the method may additionally include detecting an input of the human passenger/operator to at least one of the vehicle operating systems.

The method may additionally include perceiving or detecting a hazard, such as an obstacle or danger, within proximity of the mapped trajectory on the road course. In such an embodiment, the method may additionally include arbitrating, via the electronic controller, at least one of the vehicle operating systems to intervene in operation of the vehicle while the vehicle is following the mapped trajectory to mitigate the perceived hazard.

The autonomous racetrack driver coach and demonstrator may be operated in a demonstrator mode. In such an embodiment, the method may additionally include perceiving a hazard within proximity of the mapped trajectory on the road course and authorizing the human passenger/operator to take over control of the vehicle operating systems to mitigate the perceived hazard on the road course.

Mapping the trajectory may include determining a plurality of control points along the defined path.

Mapping the trajectory may additionally include determining a control input to at least one of the vehicle operating systems at each of the plurality of control points to generate respective control point trajectories.

Mapping the trajectory may additionally include determining an optimal sequence in time for control inputs to the vehicle operating systems such that the lap time is minimized.

The method may also include using the determined optimal sequence in time for control inputs to the vehicle operating systems as an initial guess in a Model Predictive Control (MPC) algorithm to propagate the MPC algorithm over an entire model-based prediction horizon.

The method may also include determining a linear approximation for the initial guess in the nonlinear prediction model at each of the respective generated control point trajectories.

The method may additionally include generating and solving a quadratic expression to determine a divergence from the linear approximation and optimized control inputs to the vehicle operating systems and applying the optimized control inputs such that divergence from the mapped trajectory is minimized.

An autonomous racetrack driver coach and demonstrator for an autonomous motor vehicle and configured to execute the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
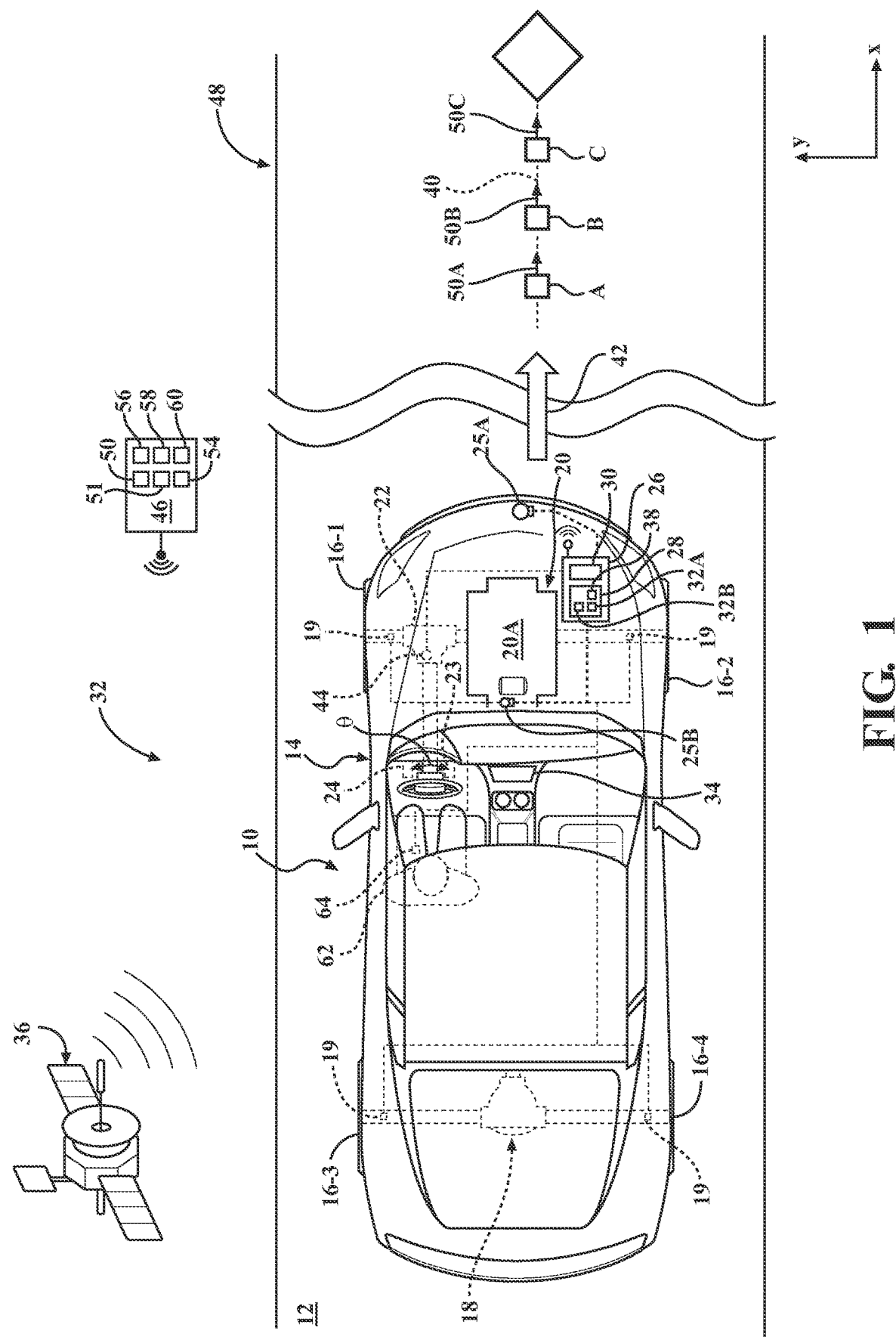
FIG. 1 is a schematic illustration of an autonomous motor vehicle employing operating systems for propulsion and maneuvering and a remote configurator in communication with the vehicle's electronic controller configured to use a global positioning system (GPS) to pilot the vehicle along a selected path, according to the disclosure.

Referring to the FIGS., wherein like numerals indicate like parts referring to the drawings, wherein like reference numbers refer to like components, FIG. 1 shows a schematic view of a motor vehicle 10 positioned relative to a road surface 12. As shown in FIG. 1, the vehicle 10 includes a vehicle body 14, a first axle having a first set of road wheels 16-1, 16-2, and a second axle having a second set of road wheels 16-3, 16-4 (such as individual left- and right-side wheels on each axle). Each of the road wheels 16-1, 16-2, 16-3, 16-4 employs tires configured to provide fictional contact with the road surface 12. Although two axles, with the respective road wheels 16-1, 16-2, 16-3, 16-4, are specifically shown, nothing precludes the motor vehicle 10 from having additional axles.

As shown in FIG. 1, a vehicle suspension system 18 operatively connects the vehicle body 14 to the respective sets of road wheels 16-1, 16-2, 16-3, 16-4 for maintaining contact between the wheels and the road surface 12, and for maintaining handling of the motor vehicle 10. The vehicle suspension system 18 may include actively controlled actuators 19 for providing adaptive vehicle spring rates, damping, roll mitigation, etc. The motor vehicle 10 additionally includes a drivetrain 20 having a power-source or multiple power-sources 20A, which may be an internal combustion engine (ICE), an electric motor, or a combination of such devices, configured to transmit a drive torque to the first axle with the road wheels 16-1, 16-2 and/or the second axle having the road wheels 16-3, 16-4. The motor vehicle 10 also employs vehicle operating or control systems, including devices such as the suspension actuators 19, one or more steering actuators 22 (for example, an electrical power steering unit) configured to steer the first axle and/or the second axle via a steering angle (θ), an accelerator device 23 for controlling power output of the power-source(s) 20A, a braking switch or device 24 for retarding rotation of the road wheels 16-1 and 16-2 (such as via individual friction brakes located at respective road wheels), etc.

As shown in FIG. 1, the motor vehicle 10 includes at least one sensor 25A and an electronic controller 26 that cooperate to at least partially control, guide, and maneuver the vehicle 10 in an autonomous mode during certain situations. As such, the vehicle 10 may be referred to as an autonomous vehicle. To enable efficient and reliable autonomous vehicle control, the electronic controller 26 may be in operative communication with the steering actuator(s) 22 configured as an electrical power steering unit, accelerator device 23, and braking device 24. The sensors 25A of the motor vehicle 10 are operable to sense the road surface 12 and monitor a surrounding geographical area and traffic conditions proximate the host vehicle.

The sensors 25A of the vehicle 10 may include, but are not limited to, at least one of a Light Detection and Ranging (LIDAR) sensor, radar, and camera located around the vehicle 10 to detect the boundary indicators, such as edge conditions, of the road surface 12. The type of sensors 25A, their location on the vehicle 10, and their operation for detecting and/or sensing the boundary indicators of the road surface 12 and monitor the surrounding geographical area and traffic conditions are understood by those skilled in the art, are not pertinent to the teachings of this disclosure, and are therefore not described in detail herein. The vehicle 10 may additionally include sensors 25B attached to the vehicle body and/or drivetrain 20.

Sensors 25B may, for example, include devices configured to detect or measure ICE engine and/or electric motor speeds, temperatures, and drive torque, transmission speed ratio, and state of battery charge. Additionally, sensors 25B may include vehicle yaw rate and angle sensors, accelerometer(s), wheel speed sensors, tire pressure sensors, a longitudinal velocity sensor, and a lateral velocity sensor configured to detect corresponding parameters and communicate respective data, for example in inertial measurement units (IMUs), to the electronic controller 26. Specific examples of sensors 25B have been provided to give a general understanding of the data being processed by the electronic controller 26, as such, the above list is not intended to be exhaustive or limiting.

The electronic controller 26 is disposed in communication with the sensors 25A of the vehicle 10 for receiving their respective sensed data related to the detection or sensing of the road surface 12 and monitoring of the surrounding geographical area and traffic conditions. The electronic controller 26 may alternatively be referred to as a control module, a control unit, a controller, a vehicle 10 controller, a computer, etc. The electronic controller 26 may include a computer and/or processor 28, and include software, hardware, memory, algorithms, connections (such as to sensors 25A and 25B), etc., for managing and controlling the operation of the vehicle 10. As such, a method, described below and generally represented in FIG. 3, may be embodied as a program or algorithm partially operable on the electronic controller 26. It should be appreciated that the electronic controller 26 may include a device capable of analyzing data from the sensors 25A and 25B, comparing data, making the decisions required to control the operation of the vehicle 10, and executing the required tasks to control the operation of the vehicle 10.

The electronic controller 26 may be embodied as one or multiple digital computers or host machines each having one or more processors 28, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The electronic controller 26 includes a tangible, non-transitory memory 30 on which computer-executable instructions, including one or more algorithms, are recorded for regulating operation of the motor vehicle 10. The subject algorithm(s) may specifically include an algorithm configured to monitor localization of the motor vehicle 10 and determine the vehicle's heading relative to a mapped vehicle trajectory on a particular road course to be described in detail below. The subject algorithm(s) also implement an autonomous racetrack driver coach and demonstrator 32, i.e., autonomous coach and demonstrator, in the motor vehicle 10 when the vehicle is negotiating the road surface 12 along a desired or selected path, including various bends and curves. The motor vehicle 10 may experience dynamic instability, especially while negotiating a turn, which may be defined as either an understeer or an oversteer condition relative to the turn, resulting in a vehicle skid or spin. The autonomous coach and demonstrator 32 implemented by the controller's algorithm(s) is specifically intended to operate the motor vehicle 10 along an optimal trajectory defined to provide the quickest lap time around a road course while mitigating the vehicle's dynamic instability. The processor 28 of the electronic controller 26 is configured to execute such algorithms.

The motor vehicle 10 also includes a vehicle navigation system 34, which may be part of integrated vehicle controls or an add-on apparatus used to find travel direction in the vehicle. The vehicle navigation system 34 is also operatively connected to a global positioning system (GPS) 36 using an earth orbiting satellite. The vehicle navigation system 34 in connection with the GPS 36 and the above-mentioned sensors 25A may be used for automation of the vehicle 10. The electronic controller 26 is in communication with the GPS 36 via the vehicle navigation system 34. The vehicle navigation system 34 uses a satellite navigation device (not shown) to receive its position data from the GPS 36, which is then correlated to the vehicle's position relative to the surrounding geographical area. Based on such information, when directions to a specific waypoint are needed, routing to such a destination may be mapped and calculated. On-the-fly terrain and/or traffic information may be used to adjust the route. Current position of a vehicle 10 may be calculated via dead reckoning—by using a previously determined position and advancing that position based upon known or estimated speeds over elapsed time and course by way of discrete control points. Data from sensors 25B attached to the vehicle's drivetrain 20, e.g., yaw rate sensor, accelerometer, and velocity sensors, and vehicle mounted radar and optical equipment may be used for greater reliability and to counter GPS 36 signal loss and/or multipath interference due to urban canyons or tunnels.

The electronic controller 26 is generally configured, i.e., programmed, to determine or identify localization 38 (current position in the X-Y plane, shown in FIG. 1), velocity, acceleration, yaw rate, as well as intended path 40, and heading 42 of the motor vehicle 10 on the road surface 12. The localization 38, intended path 40, and heading 42 of the motor vehicle 10 may be determined via the navigation system 34 receiving data from the GPS 36, while velocity, acceleration (including longitudinal and lateral g's), and yaw rate may be determined from vehicle sensors 25B. Alternatively, the electronic controller 26 may use other systems or detection sources arranged remotely with respect to the vehicle 10, for example a camera, to determine localization 38 of the vehicle relative to the road surface 12. The desired path may include discrete control waypoints, such as points A, B, and C shown in FIG. 1.

As noted above, the motor vehicle 10 may be configured to operate in an autonomous mode guided by the electronic controller 26. In such a mode, the electronic controller 26 may further obtain data from vehicle sensors 25B to guide the vehicle along the desired path, such as via regulating the steering actuator 22. The electronic controller 26 may be additionally programmed to detect and monitor the steering angle (θ) of the steering actuator(s) 22 along the desired path 40, such as during a negotiated turn. Specifically, the electronic controller 26 may be programmed to determine the steering angle (θ) via receiving and processing data signals from a steering position sensor 44 (shown in FIG. 1) in communication with the steering actuator(s) 22, as well as operative positions of the suspension actuators 19, accelerator device 23, and braking device 24.

With resumed reference to FIG. 1, the autonomous racetrack driver coach and demonstrator 32 additionally includes a remote configurator 46. The remote configurator 46 may be a standalone processor located remotely from the vehicle 10 and in wireless communication with the electronic controller 26. For example, the remote configurator 46 may be an external information technology (IT) cloud server arranged remotely from the vehicle 10 and in wireless communication with the vehicle telematics via the electronic controller 26. Such an IT cloud server may be in wireless communication with remote detection sources, such as the GPS 36, and/or with multiple electronic controllers on respective vehicles, such as the vehicle 10, and configured to receive navigation data from the subject vehicle controllers and store the received data in an IT cloud database (not shown).

Figure 2:
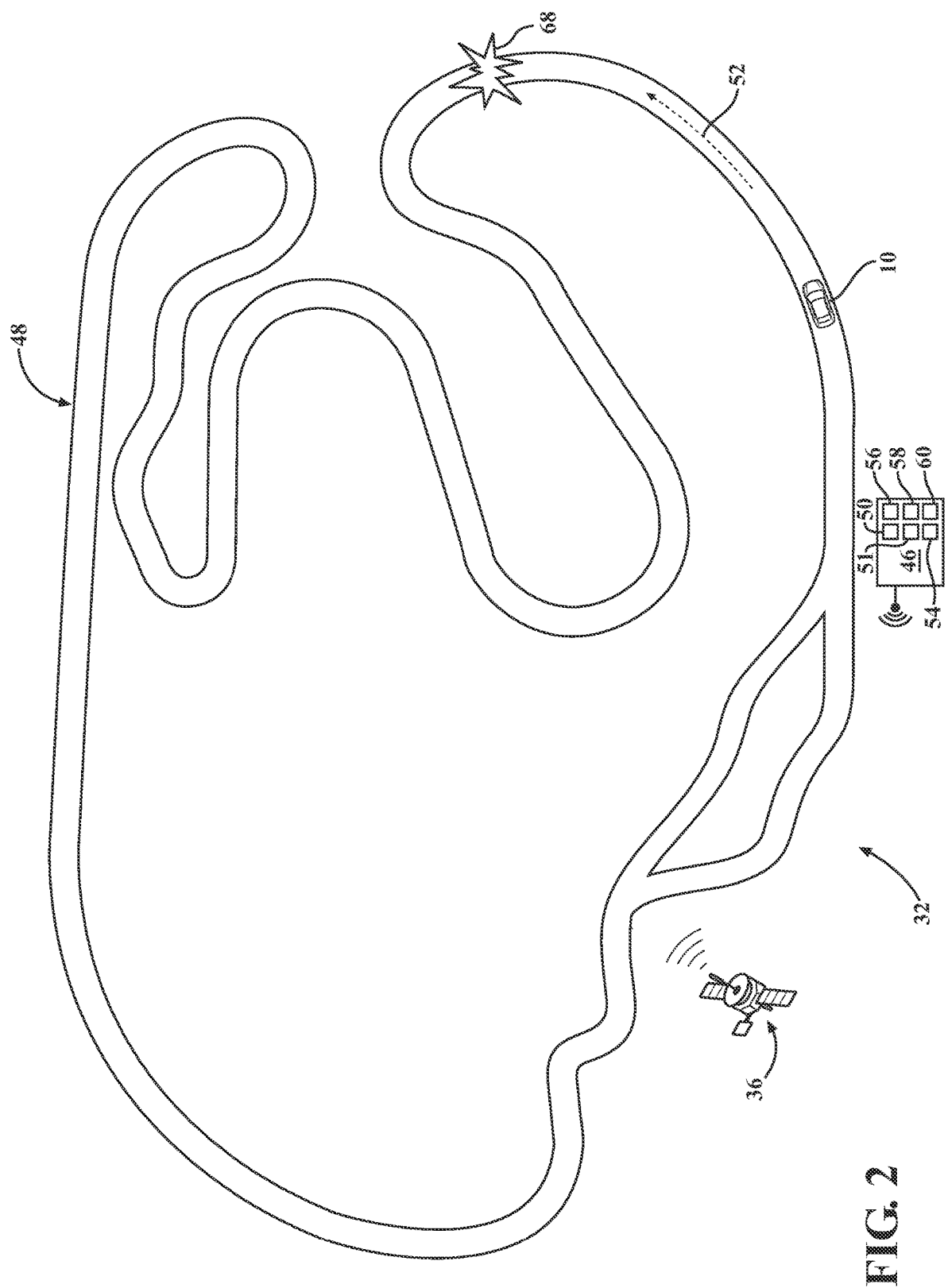
FIG. 2 schematically illustrates the vehicle shown in FIG. 1 positioned on a road course.

The remote configurator 46 is specifically configured to identify a road course 48 and project or map offline, i.e., prior to the motor vehicle 10 being operated on the road course 48, an optimal trajectory 50 for the vehicle 10 defining a desired path 52 of the vehicle around the road course, as shown in FIG. 2. The road course 48 may be identified via the GPS 36 or using an earlier generated file communicated by an information source (not shown) external to the remote configurator 46. The remote configurator 46 is also configured to determine or map the vehicle's velocity profile 51 along the road course 48, e.g., vehicle velocity at each of the plurality of control points A, B, and C. The optimal trajectory 50 is a path around the road course 48, together with the projected velocity profile 51 is intended to provide the quickest lap time for the vehicle 10 around the road course 48, i.e., minimize the time required for the vehicle to complete a lap of the circuit.

The remote configurator 46 may be configured to map the trajectory 50 via determining, i.e., setting or identifying, a plurality of control points, such as the points A, B, and C, along the defined path 52. The remote configurator 46 may be additionally configured to map the trajectory 50 via determining a control input 54 to at least one of the vehicle operating systems, e.g., suspension actuators 19, steering actuator(s) 22, accelerator device 23, and braking device 24, at each of the plurality of control points, such as the points A, B, C, to generate respective control point trajectories 50A, 50B, 50c (shown in FIG. 1). As shown in FIG. 2, the remote configurator 46 may be further configured to map the trajectory 50 via determining an optimal sequence 56 in time for control inputs to the vehicle operating systems, e.g., suspension actuators 19, steering actuator(s) 22, accelerator device 23, and the braking device 24, such that the lap time around the road course 48 is minimized. The remote configurator 46 may also be configured to use the determined optimal sequence 56 in time for control inputs to the vehicle operating systems (the suspension actuators 19, steering actuator(s) 22, the accelerator device 23, and the braking device 24, etc.) as an initial guess in a Model Predictive Control (MPC) algorithm 58 running in real-time as the vehicle 10 progresses along the road course 48.

In general, MPC is a control strategy employed to optimize each subsequent control step by predicting future behavior of the system based on presently captured data and empirically determined correlation between system parameters indicative of the system's likely behavior. A simplified model of the system being controlled permits prediction of the system's behavior is incorporated into the feedback control loop. Based on the presently captured data and the subject model, the system's processor evaluates multiple possible solutions and selects the solution considered to be most likely to optimize the outcome based on priorities and constraints. Consequently, both the prediction and optimization are accomplished at each control step of the approach. One of the advantages of MPC is the concurrent optimization of multiple inputs and outputs, while considering a wide range of priorities and constraints.

The MPC algorithm 58 may be configured to determine the trajectory 50 by repeatedly solving a model-based open-loop finite-horizon optimal control expression employing constraints on the vehicle operating systems, e.g., suspension actuators 19, steering actuator(s) 22, accelerator device 23, and the braking device 24 to generate respective control point trajectories 50A, 50B, 50c. The subject constraints on the vehicle operating systems may include steering rate and angle limits, throttle position points in the case of an ICE engine or electrical current control inputs in the case of an electric motor, and brake force parameters. Specifically, the MPC algorithm 58 may be used to find the optimal control sequence 56 for the subject vehicle operating systems over a future horizon in a limited number of steps. At each sample time, the vehicle state may be estimated to minimize a performance index subjected to the prediction model and the constraints on the corresponding vehicle operating systems.

For example, the MPC algorithm 58 may employ Linear Time Varying (LTV) MPC which linearizes the nonlinear model online with respect to the reference (specifically, the predetermined mapped control point trajectories 50A, 50B, 50c) and constructs a quadratic program (QP). QP may then be used to solve a resultant mathematical optimization problem involving a multivariate quadratic function subject to linear input constraints on the vehicle operating systems determined to follow the planned trajectories, thus reducing lap time of the vehicle 10 around the road course 48. In another nonlimiting example, the MPC algorithm 58 may employ nonlinear MPC with sequential quadratic programming (SQP). The MPC algorithm 58 would linearize the nonlinear model online with respect to an initial guess and construct a QP. The solution of the QP would generate a new guess for a second iteration of the algorithm, and so forth until convergence. Hence, in each computational step of the MPC algorithm 58 there would be one or more iterations. The guess to the first iteration of a new step would typically be a solution from the previous computational time step.

The determined optimal control sequence 56 is used as the initial guess in the MPC algorithm 58 to propagate the MPC algorithm over an entire model-based prediction horizon. The remote configurator 46 may be additionally configured to determine a linear approximation 60 for each initial guess in the nonlinear prediction model at each of the respective generated control point trajectories 50A, 50B, 50c. The remote configurator 46 may be further configured to generate and solve an optimization function subject to given road course and vehicle constraints. Specifically, the generated optimization function may be in the form of a quadratic expression used to determine a divergence from the determined linear approximation 60 for each initial guess and apply the respective determined linear approximations and divergences to determine optimized control inputs to the vehicle operating systems, e.g., suspension actuators 19, steering actuator(s) 22, accelerator device 23, and the braking device 24.

Following resolution of the optimization function, the electronic controller 26 may apply the optimized control inputs to minimize divergence of the actual vehicle 10 path from the mapped trajectory 50. As a result, the remote configurator 46 and the MPC algorithm 58 may permit the electronic controller 26 to generate real-time instruction and correction to the human passenger/operator's control inputs to vehicle operating system(s) to more closely follow the path 52 and thereby reduce lap time of the vehicle 10 around the road course 48. Additionally, the remote configurator 46 and the MPC algorithm 58 may permit the electronic controller 26 to autonomously pilot the motor vehicle 10 following the trajectory 50 and thereby instruct the human passenger/operator 62 how to achieve more effective lap time around the road course 48, as will be discussed in detail below.

The autonomous coach and demonstrator 32 also includes a vehicle sensor 64 (shown in FIG. 1), such as an interior camera, a seat sensor, etc., in communication with the electronic controller 26. The vehicle sensor 64 is configured to detect a presence of a human passenger/operator 62 in the vehicle 10, for example, situated in a driver's seat, and thereby facilitate determination of such human passenger/operator's presence by the electronic controller 26. The electronic controller 26 is also configured to identify or determine the localization 38 of the vehicle 10 on the road course 48. The electronic controller 26 is additionally configured to monitor the localization 38 and determine a heading 42 of the vehicle 10 relative to the mapped trajectory 50 on the road course 48. The electronic controller 26 is also configured to determine a response of the vehicle 10 to input(s) to the vehicle control system(s). The electronic controller 26 is further configured to operate the vehicle 10, with the human passenger/operator 62 situated therein, to follow the mapped trajectory 50 using feedback control of the vehicle operating systems in response to the determined localization 38 and heading 42.

The autonomous coach and demonstrator 32 may be operated in a driver coach mode 32A (shown in FIG. 1). In the driver coach mode 32A, the electronic controller 26 may be configured to detect an input of the human passenger/operator 62 to at least one of the vehicle operating systems, e.g., suspension actuators 19, steering actuator(s) 22, accelerator device 23, and the braking device 24. The autonomous coach and demonstrator 32 may employ parameters detected by above-noted vehicle sensors 25B (e.g., yaw rate sensor, accelerometer, wheel speed sensors, longitudinal velocity sensor, and lateral velocity sensor) to instruct the human passenger/operator 62 with respect to desired control inputs for following the mapped trajectory 50 along the road course 48. In other words, in the driver coach mode 32A, the autonomous coach and demonstrator 32 is configured to inform the human passenger/operator 62, in real-time, regarding the most effective vehicle control inputs for achieving an optimal lap time.

Additionally, in the driver coach mode 32A mode, the electronic controller 26 may be configured to perceive or detect via the imaging sensor 25A, such as a camera or a LIDAR, a potential hazard 68 (shown in FIG. 2), such as an obstacle or other type of danger, within proximity of the mapped trajectory 50 on the road course 48. An exemplary obstacle may be another vehicle or an animal suddenly appearing on the road course 48 or near the path 52. The electronic controller 26 may be further configured to arbitrate at least one of the vehicle operating systems, e.g., suspension actuators 19, steering actuator(s) 22, accelerator device 23, and the braking device 24, to intervene in operation of the vehicle 10, i.e., vehicle propulsion and heading 42, while the vehicle is following the mapped trajectory 50. Therefore, arbitration of the vehicle operating systems via the controller 26 in such an instance is intended to mitigate the perceived hazard 68. Overall, the driver coach mode 32A is specifically configured to generate real-time instructions to the human passenger/operator 62, to more closely follow the path 52 and thereby reduce lap time of the vehicle 10 around the road course 48.

Alternatively, the autonomous coach and demonstrator 32 may be operated in a demonstrator mode 32B (shown in FIG. 1). The autonomous coach and demonstrator 32 may employ parameters detected by the vehicle sensors 25B to affect desired control inputs for following the mapped trajectory 50 along the road course 48. In other words, in the demonstrator mode 32B, the autonomous coach and demonstrator 32 is configured to autonomously select the most effective vehicle control inputs for achieving an optimal lap time. In the demonstrator mode 32B mode, the electronic controller 26 may be additionally configured to perceive or detect the hazard 68 on the road course 48. The electronic controller 26 may be further configured to authorize the human passenger/operator 62 to take over control of the vehicle operating systems, e.g., suspension actuators 19, steering actuator(s) 22, accelerator device 23, and braking device 24, to mitigate the perceived hazard 68. Overall, the demonstrator mode 32B is specifically configured to autonomously pilot the vehicle 10 around the road course 48, thereby demonstrating to the human passenger/operator 62 appropriate control of the vehicle for achieving the trajectory 50.

Figure 3:
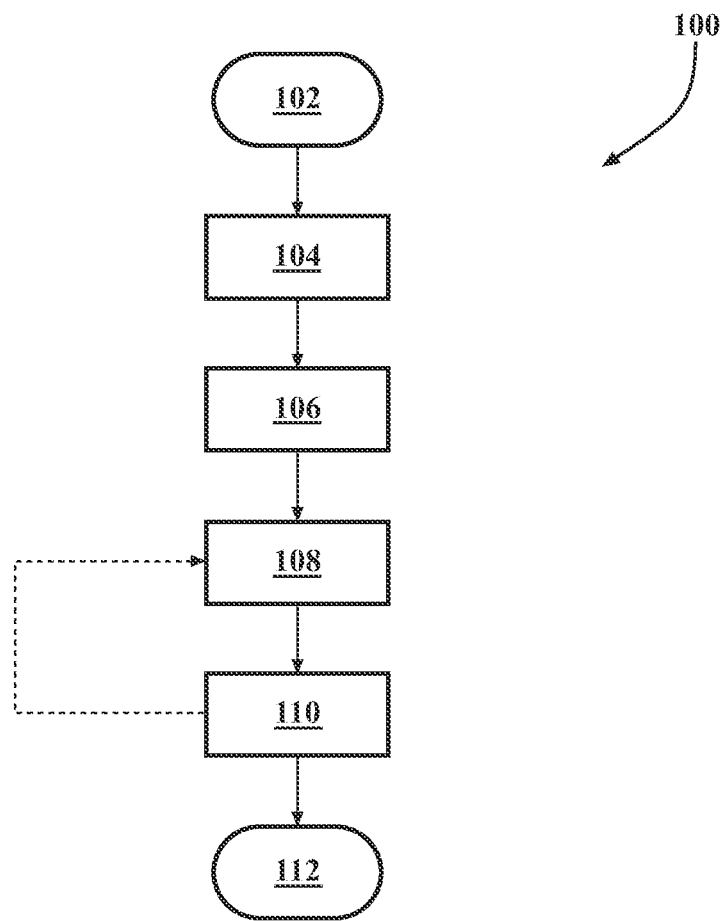
FIG. 3 is a flow diagram of a method of operating an autonomous racetrack driver coach and demonstrator in the autonomous motor vehicle shown in FIGS. 1 and 2, according to the disclosure.

A method 100 of operating the autonomous racetrack driver coach and demonstrator 32 in an autonomous motor vehicle, such as the vehicle 10 described with respect to FIGS. 1-2, is depicted in FIG. 3 and disclosed in detail below. As described above with respect to FIGS. 1-2, the autonomous racetrack driver coach and demonstrator 32 may be operated in either the driver coach mode 32A or the demonstrator mode 32B. Method 100 commences in frame 102 with identifying the road course 48, for example by the human passenger/operator 62 or the electronic controller 26. In frame 102, the method additionally includes mapping, via the remote configurator 46, the optimal or desired trajectory 50 for the vehicle 10 defining the path 52 of the vehicle configured to minimize the vehicle's lap time around the road course 48.

As described with respect to FIGS. 1-2, mapping the trajectory 50 may include determining a plurality of control points, such as the points A, B, C, along the defined path 52. Mapping the trajectory 50 may additionally include determining control input(s) to at least one of the vehicle operating systems, e.g., suspension actuators 19, steering actuator(s) 22, accelerator device 23, and braking device 24, at each of the plurality of control points to generate respective control point trajectories 50A, 50B, 50c. Additionally, mapping the trajectory 50 may include determining the optimal sequence 56 in time for control inputs to the vehicle operating systems, such that the lap time is minimized. After frame 102, the method advances to frame 104.

In frame 104, the method includes determining, via an appropriate sensor 64 in communication with the electronic controller 26, a presence of the human passenger/operator 62 situated in the vehicle 10. Additionally, in the driver coach mode 32A, in frame 104, the method may include detecting an input of the human passenger/operator 62 to at least one of the vehicle operating systems, e.g., suspension actuators 19, steering actuator(s) 22, accelerator device 23, and braking device 24. In frame 104, the method may also include perceiving a hazard or obstacle 68 within proximity of the mapped trajectory 50 on the road course 48. The method may then proceed with arbitrating, via the electronic controller 26, at least one of the subject vehicle operating systems to intervene in operation of the vehicle 10 to mitigate the perceived hazard 68, while the vehicle is following the mapped trajectory 50. Alternatively, in the demonstrator mode 32B, the method may include perceiving or detecting the hazard 68 on the road course 48 and authorizing the human passenger/operator 62 to take over control of the vehicle operating systems to mitigate the perceived hazard. After frame 104, the method proceeds to frame 106.

In frame 106, the method includes determining, via the electronic controller 26, localization 38 of the vehicle 10 on the road course 48. After frame 106, the method advances to frame 108. In frame 108 the method includes monitoring the localization 38 and determining localization 38, heading 42, as well as velocity, acceleration, and yaw rate of the vehicle 10, via the electronic controller 26, relative to the mapped trajectory 50 on the road course 48. In frame 108 the method additionally includes determining a response of the vehicle 10 to the input to the vehicle control system(s), such as the suspension actuators 19, the steering actuator(s) 22, the accelerator device 23, and the braking device 24. After frame 108, the method moves on to frame 110.

In frame 110, the method includes operating the vehicle 10, with the human passenger/operator 62 situated therein, in either driver or passenger capacity, via the electronic controller 26, to follow the mapped trajectory 50 using feedback control of the vehicle operating systems in response to the determined localization 38 and heading 42. Operating the vehicle in frame 110 may include correcting the heading 42 by controlling the vehicle operating system(s) to maintain or reestablish the vehicle path 52 in response to the determined localization 38. Specifically, the method may include determining, via the remote configurator 46, the linear approximation 60 for each initial guess in the non-linear prediction model at each of the respective generated control point trajectories 50A, 50B, 50c.

As described above with respect to FIGS. 1-2, the MPC algorithm 58 may, for example, include using a quadratic expression to determine a divergence from the determined linear approximation 60 for each initial guess and apply determined linear approximations and divergences to determine optimized control inputs to the vehicle operating systems. The electronic controller 26 may in turn apply the optimized control inputs such that divergence from the mapped trajectory 50 is minimized. As a result, the remote configurator 46 may permit real-time instruction and correction to control inputs of either the human passenger/ operator's or that of the electronic controller 26 and facilitate the vehicle operating system(s) to more closely follow the path 52, and thereby reduce lap time of the vehicle 10 around the road course 48. From frame 110, the method may loop back to frame 108 for identifying the next waypoint, such as one of the points A, B, and C shown in FIG. 1, and establishing localization 38, velocity, acceleration, yaw rate, and heading 42 of the vehicle 10 on the road course 48 with respect to the mapped trajectory 50. Alternatively, the method may conclude in frame 112 with the motor vehicle 10 reaching a predetermined operating cycle, such as a full lap on the road course 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating an autonomous racetrack driver coach and demonstrator in an autonomous motor vehicle employing vehicle operating systems for propulsion and maneuvering, the method comprising:
    identifying a road course and mapping, via a configurator arranged remotely from the vehicle, a velocity profile of the vehicle and a trajectory for the vehicle defining a path of the vehicle around the road course configured to minimize the vehicle's road course lap time;
    determining a presence of a human passenger/operator situated in the vehicle;
    determining, via an electronic controller in communication with a detection source arranged remotely from the vehicle, localization of the vehicle on the road course;
    monitoring the localization and determining velocity, acceleration, and heading of the vehicle, via the electronic controller, relative to the mapped trajectory on the road course; and
    operating the vehicle, with the human passenger/operator situated therein, via the electronic controller, to follow the mapped trajectory using feedback control of the vehicle operating systems in response to the determined localization, velocity, acceleration, and heading.

2. The method according to claim 1, wherein the autonomous racetrack driver coach and demonstrator is operated in a driver coach mode, further comprising detecting an input of the human passenger/operator to at least one of the vehicle operating systems.

3. The method according to claim 2, further comprising:
    perceiving a hazard within proximity of the mapped trajectory on the road course; and
    arbitrating, via the electronic controller, at least one of the vehicle operating systems to intervene in operation of the vehicle while the vehicle is following the mapped trajectory to mitigate the perceived hazard.

4. The method according to claim 1, wherein the autonomous racetrack driver coach and demonstrator is operated in a demonstrator mode, further comprising perceiving a hazard within proximity of the mapped trajectory on the road course and authorizing the human passenger/operator to take over control of the vehicle operating systems to mitigate the perceived hazard.

5. The method according to claim 1, wherein mapping the trajectory includes determining a plurality of control points along the defined path.

6. The method according to claim 5, wherein mapping the trajectory additionally includes determining a control input to at least one of the vehicle operating systems at each of the plurality of control points to generate respective control point trajectories.

7. The method according to claim 6, wherein mapping the trajectory additionally includes determining an optimal sequence in time for control inputs to the vehicle operating systems such that the lap time is minimized.

8. The method according to claim 7, further comprising using the determined optimal sequence in time for control inputs to the vehicle operating systems as an initial guess in a Model Predictive Control (MPC) algorithm to propagate the MPC algorithm over an entire model-based prediction horizon.

9. The method according to claim 8, further comprising determining a linear approximation for the initial guess in the nonlinear prediction model at each of the respective generated control point trajectories.

10. The method according to claim 9, further comprising generating and solving a quadratic expression to determine a divergence from the linear approximation to determine optimized control inputs to the vehicle operating systems and applying the optimized control inputs such that divergence from the mapped trajectory is minimized.

11. An autonomous racetrack driver coach and demonstrator for an autonomous motor vehicle employing vehicle operating systems for propulsion and maneuvering, the method comprising:
    a configurator arranged remotely from the vehicle and configured to identify a road course and map a velocity profile of the vehicle and a trajectory for the vehicle defining a path of the vehicle around the road course configured to minimize the vehicle's road course lap time;
    a vehicle sensor configured to detect a presence of a human passenger/operator situated in the vehicle;
    an electronic controller in communication with a detection source arranged remotely from the vehicle and configured to:
        determine localization of the vehicle on the road course;
        monitor the localization and determine velocity, acceleration, and heading of the vehicle relative to the mapped trajectory on the road course; and
        operate the vehicle, with the human passenger/operator situated therein, to follow the mapped trajectory using feedback control of the vehicle operating systems in response to the determined localization, velocity, acceleration, and heading.

12. The autonomous racetrack driver coach and demonstrator according to claim 11, wherein the autonomous racetrack driver coach and demonstrator is operated in a driver coach mode, and wherein the electronic controller is additionally configured to detect an input of the human passenger/operator to at least one of the vehicle operating systems.

13. The autonomous racetrack driver coach and demonstrator according to claim 12, wherein the electronic controller is additionally configured to:

perceive a hazard within proximity of the mapped trajectory on the road course; and arbitrate at least one of the vehicle operating systems to intervene in operation of the vehicle while the vehicle is following the mapped trajectory to mitigate the perceived hazard.

14. The autonomous racetrack driver coach and demonstrator according to claim 11, wherein the autonomous racetrack driver coach and demonstrator is operated in a demonstrator mode, wherein the electronic controller is additionally configured to perceive a hazard within proximity of the mapped trajectory on the road course and authorize the human passenger/operator to take over control of the vehicle operating systems to mitigate the perceived hazard.

15. The autonomous racetrack driver coach and demonstrator according to claim 11, wherein the configurator is additionally configured to map the trajectory via determining a plurality of control points along the defined path and determining a control input to at least one of the vehicle operating systems at each of the plurality of control points to generate respective control point trajectories.

16. The autonomous racetrack driver coach and demonstrator according to claim 15, wherein the configurator is additionally configured to map the trajectory via determining an optimal sequence in time for control inputs to the vehicle operating systems such that the lap time is minimized.

17. The autonomous racetrack driver coach and demonstrator according to claim 16, wherein the configurator is additionally configured to use the determined optimal sequence in time for control inputs to the vehicle operating systems as an initial guess in a Model Predictive Control (MPC) algorithm to propagate the MPC algorithm over an entire model-based prediction horizon.

18. The autonomous racetrack driver coach and demonstrator according to claim 17, wherein the configurator is additionally configured to determine a linear approximation for the initial guess in the nonlinear prediction model at each of the respective generated control point trajectories.

19. The autonomous racetrack driver coach and demonstrator according to claim 18, wherein the configurator is additionally configured to generate and solve a quadratic expression to determine a divergence from the linear approximation to determine optimized control inputs to the vehicle operating systems and apply the optimized control inputs such that divergence from the mapped trajectory is minimized.

20. An autonomous racetrack driver coach and demonstrator for an autonomous motor vehicle employing vehicle operating systems for propulsion and maneuvering, the method comprising:

a configurator arranged remotely from the vehicle and configured to identify a road course and map a velocity profile of the vehicle and a trajectory for the vehicle defining a path of the vehicle around the road course configured to minimize the vehicle's road course lap time;

a vehicle sensor configured to detect a presence of a human passenger/operator situated in the vehicle;

an electronic controller in communication with a detection source arranged remotely from the vehicle and configured to:

determine localization of the vehicle on the road course;

monitor the localization and determine velocity, acceleration, and heading of the vehicle relative to the mapped trajectory on the road course; and operate the vehicle, with the human passenger/operator situated therein, to follow the mapped trajectory using feedback control of the vehicle operating systems in response to the determined localization, velocity, acceleration, and heading;

wherein:

the autonomous racetrack driver coach and demonstrator is selectively operated in a driver coach mode and in a demonstrator mode;

in the driver coach mode, the electronic controller is additionally configured to detect an input of the human passenger/operator to at least one of the vehicle operating systems, perceive a hazard within proximity of the mapped trajectory on the road course, and arbitrate at least one of the vehicle operating systems to intervene in operation of the vehicle while the vehicle is following the mapped trajectory to mitigate the perceived hazard; and in the demonstrator mode, the electronic controller is further configured to perceive the hazard within proximity of the mapped trajectory on the road course and authorize the human passenger/operator to take over control of the vehicle operating systems to mitigate the perceived hazard.

* * * * *